United States Patent

Bourbon

Patent Number: 5,822,408
Date of Patent: Oct. 13, 1998

[54] METHOD AND APPARATUS FOR VERIFYING THE IDENTITY OF A RECEIVER OF A FACSIMILE

[76] Inventor: Ralph Bourbon, 40 Skyline Dr., Staten Island, N.Y. 10304

[21] Appl. No.: 775,154

[22] Filed: Dec. 31, 1996

[51] Int. Cl.⁶ .................................................. H04M 11/00
[52] U.S. Cl. .................... 379/100.02; 358/435; 358/436; 379/93.02
[58] Field of Search ............................. 379/90.01, 93.01, 379/93.02, 92.03, 93.05, 93.09, 93.17, 93.23, 100.01, 93.07, 93.18, 100.06, 100.08, 100.09, 100.17; 358/400, 402, 434, 435, 436, 438, 439, 440, 442, 468

[56] References Cited

U.S. PATENT DOCUMENTS

| | | | |
|---|---|---|---|
| 4,264,442 | 4/1981 | Hashimoto | 379/93.01 |
| 5,353,124 | 10/1994 | Chou et al. | 358/400 |
| 5,552,897 | 9/1996 | Mandelbaum et al. | 358/400 |
| 5,621,539 | 4/1997 | Brown et al. | 379/100.01 |

*Primary Examiner*—Curtis Kuntz
*Assistant Examiner*—Melur Ramakrishnaiah

[57] ABSTRACT

An apparatus for verifying the identity of a receiver of a facsimile including a display adapted to receive a numeric signal and further depict numbers which the numeric signal represents. Also included is a numeric keypad with a plurality of number keys for transmitting a numeric signal representative of a plurality of numbers upon the depression of corresponding number keys. Further provided is an alarm indicator adapted to alert a user upon the receipt of an alarm indicator signal. Finally, control circuitry is electrically connected to the display, the keypadeipt of an and the alarm indicator. In use, both a receiver and a sender of a facsimile have an apparatus as set forth hereinabove. The control circuitry of the receiver has a receipt mode wherein the control circuitry is adapted to transmit to the alarm indicator the alarm indicator signal upon the receipt of an initialization signal, preferably in the form of a phone call. The control circuitry is further adapted to allow the transmission of numeric signals to the apparatus of the sender upon the depression of corresponding numeric keys of the keypad. The control circuitry of the sender is adapted in a sender mode to allow the transmission of such numeric signals to the display upon the receipt thereof for verification.

6 Claims, 5 Drawing Sheets

METHOD AND APPARATUS FOR VERIFYING THE IDENTITY OF A RECEIVER OF A FACSIMILE

BACKGROUND OF THE INVENTION

1. Field of the Invention

The present invention relates to a method and apparatus for verifying the identity of a receiver of a facsimile and more particularly pertains to ensuring that a facsimile is received by the appropriate person.

2. Description of the Prior Art

The use of facsimiles is known in the prior art. More specifically, facsimiles heretofore devised and utilized for the purpose of transmitting documents along telephone lines are known to consist basically of familiar, expected and obvious structural configurations, notwithstanding the myriad of designs encompassed by the crowded prior art which have been developed for the fulfillment of countless objectives and requirements.

In this respect, the method and apparatus for verifying the identity of a receiver of a facsimile according to the present invention substantially departs from the conventional concepts and designs of the prior art, and in so doing provides an apparatus primarily developed for the purpose of ensuring that a facsimile is received by the appropriate person.

Therefore, it can be appreciated that there exists a continuing need for a new and improved method and apparatus for verifying the identity of a receiver of a facsimile which can be used for ensuring that a facsimile is received by the appropriate person. In this regard, the present invention substantially fulfills this need.

SUMMARY OF THE INVENTION

In view of the foregoing disadvantages inherent in the known types of facsimiles now present in the prior art, the present invention provides an improved method and apparatus for verifying the identity of a receiver of a facsimile. As such, the general purpose of the present invention, which will be described subsequently in greater detail, is to provide a new and improved method and apparatus for verifying the identity of a receiver of a facsimile which has all the advantages of the prior art and none of the disadvantages.

To attain this, the present invention essentially comprises a plurality of conventional phones. Each phone has an interfacing jack. Attached to each phone is a facsimile password unit. A first component of each facsimile password unit is a housing with a top face, a bottom face, and a periphery integrally coupled therebetween thereby defining an interior space. The periphery of the housing is coupled to an associated phone. A digital liquid crystal display is situated on the front face of the housing. The liquid crystal display is adapted to depict numbers thereon representative of a numeric signal upon the receipt thereof. Yet another component of each facsimile password unit is a numeric keypad with a plurality of number keys positioned on the front face of the housing. The keypad is adapted for transmitting a numeric signal representative of a plurality of numbers upon the depression of corresponding number keys. Further provided is a speaker situated on the front face of the housing. In use, the speaker is adapted to transmit a unique audible indicator alarm upon the receipt of an indicator alarm signal. Associated therewith is a light emitting diode positioned on the front face of the housing. The light emitting diode is included for intermittently emitting an indicator light upon the receipt of an indicator light signal. A telephone interface module is situated within the interior space of the housing. The telephone interface module has an input with an associated jack formed on the periphery of the housing. The jack of the input is connected to a conventional telephone line. The telephone interface module further has an output with an associated jack formed on the periphery the housing. The jack of the output is coupled to an interfacing jack of a corresponding conventional telephone. The telephone interface module also has an internal interface for reasons that will become apparent later. In operation, the telephone interface module has a first mode of operation upon the lack of receipt of an initiation signal for allowing communication only between the input and the output. As such, normal operation of the conventional telephone is afforded. For allowing communication only between the input and the internal interface, the telephone interface module further has a second mode of operation upon the receipt of the initialization signal. Still yet another component of the facsimile password unit is an initialization key situated on the front face of the housing. The initialization key is electrically connected to the telephone interface. The initialization key is adapted for deploying an initialization signal to the conventional telephone line upon the use of the phone to connect via the telephone line to a second phone. Finally, for governing the operation thereof, the facsimile password unit includes control circuitry situated within the interior space of the housing. The control circuitry is electrically connected to the display, the keypad, the light emitting diode, the initialization key, the speaker, and the internal interface of telephone interface. In use, the control circuitry has a receipt mode. In such mode, when the telephone interface is in the second mode thereof, the control circuitry is adapted to transmit to the light emitting diode the indicator light signal and further transmit to the speaker the alarm indicator signal. After such, the control circuitry is further adapted to effect the transmission of an initialization signal and subsequently allow numeric signals to be transmitted to the conventional telephone line upon the depression of corresponding numeric keys on the keypad. In a sender mode, the control circuitry is further adapted to allow the transmission of numeric signals to the display upon the receipt of an initialization signal and subsequent receipt of the numeric signals.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved method and apparatus for verifying the identity of a receiver of a facsimile which has all the advantages of the prior art facsimiles and none of the disadvantages.

It is another object of the present invention to provide a new and improved method and apparatus for verifying the identity of a receiver of a facsimile which may be easily and efficiently manufactured and marketed.

It is a further object of the present invention to provide a new and improved method and apparatus for verifying the identity of a receiver of a facsimile which is of a durable and reliable construction.

An even further object of the present invention is to provide a new and improved method and apparatus for verifying the identity of a receiver of a facsimile which is susceptible of a low cost of manufacture with regard to both materials and labor, and which accordingly is then susceptible of low prices of sale to the consuming public, thereby making such method and apparatus for verifying the identity of a receiver of a facsimile economically available to the buying public.

Still yet another object of the present invention is to provide a new and improved method and apparatus for verifying the identity of a receiver of a facsimile which provides in the apparatuses and methods of the prior art some of the advantages thereof, while simultaneously overcoming some of the disadvantages normally associated therewith.

Still another object of the present invention is to ensure that a facsimile is received by the appropriate person.

Lastly, it is an object of the present invention to provide a new and improved apparatus for verifying the identity of a receiver of a facsimile including a display adapted to receive a numeric signal and further depict numbers which the numeric signal represents. Also included is a numeric keypad with a plurality of number keys for transmitting a numeric signal representative of a plurality of numbers upon the depression of corresponding number keys. Further provided is an alarm indicator adapted to alert a user upon the receipt of an alarm indicator signal. Finally, control circuitry is electrically connected to the display, the keypad, and the alarm indicator. In use, both a receiver and a sender of a facsimile have an apparatus as set forth hereinabove. The control circuitry of the receiver has a receipt mode wherein the control circuitry is adapted to transmit to the alarm indicator the alarm indicator signal upon the receipt of an initialization signal, preferably in the form of a phone call. The control circuitry is further adapted to allow the transmission of numeric signals to the apparatus of the sender upon the depression of corresponding numeric keys of the keypad. The control circuitry of the sender is adapted in a sender mode to allow the transmission of such numeric signals to the display upon the receipt thereof for verification.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
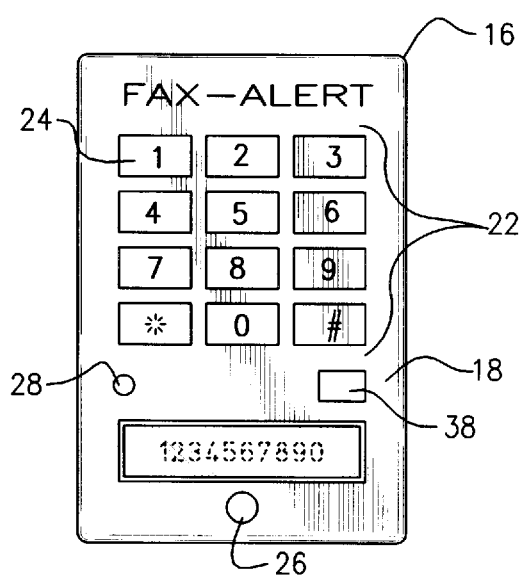
FIG. 1 is a perspective illustration of the preferred embodiment of the apparatus for verifying the identity of a receiver of a facsimile constructed in accordance with the principles of the present invention.
Figure 2:
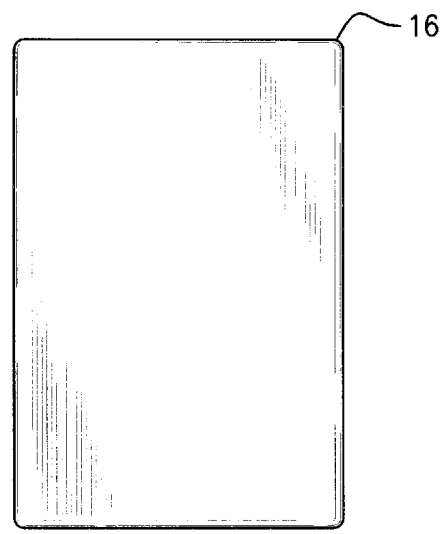
FIG. 2 is a rear elevational view of the present invention.
Figure 3:
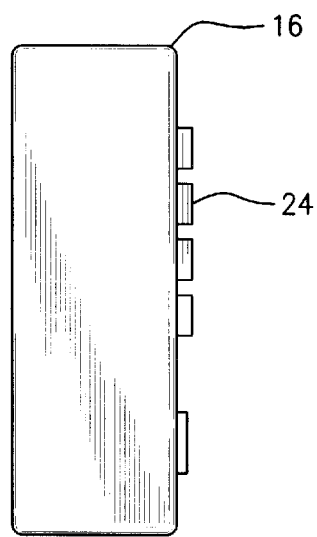
FIG. 3 is a side elevational view of the present invention.

With reference now to the drawings, and in particular to FIG. 1 thereof, a new and improved method and apparatus for verifying the identity of a receiver of a facsimile embodying the principles and concepts of the present invention and generally designated by the reference numeral 10 will be described.

The present invention, the new and improved method and apparatus for verifying the identity of a receiver of a facsimile, is comprised of a plurality of components. Such components in their broadest context include a plurality of conventional telephones each with an associated facsimile password unit. Such components are individually configured and correlated with respect to each other so as to attain the desired objective.

More specifically, it will be noted that the system 10 of the present invention is adapted to be used with a plurality of conventional phones 12. Each phone has an interfacing jack 14.

Attached to each phone is a facsimile password unit 16. A first component of each facsimile password unit is a housing 18 with a top face, a bottom face, and a periphery integrally coupled therebetween thereby defining an interior space. The periphery of the housing is coupled to an associated phone.

A digital liquid crystal display 20 is situated on the front face of the housing. The liquid crystal display is adapted to depict numbers thereon representative of a numeric signal upon the receipt thereof. Preferably, the liquid crystal display is capable of depicting at least a four digital number.

Yet another component of each facsimile password unit is a numeric keypad 22 with a plurality of number keys 24 positioned on the front face of the housing. Such keys suitably have numbers 1–9 depicted thereon. The keypad is adapted for transmitting a numeric signal representative of a plurality of numbers upon the depression of corresponding number keys.

Further provided is a speaker 26 situated on the front face of the housing. In use, the speaker is adapted to transmit a unique audible indicator alarm upon the receipt of an indicator alarm signal. It is imperative that the audible indicator alarm is easily discernable from the conventional ring of the associated phone.

Associated therewith is a light emitting diode 28 positioned on the front face of the housing. The light emitting diode is included for intermittently emitting an indicator light upon the receipt of an indicator light signal.

A telephone interface module 30 is situated within the interior space of the housing. The telephone interface module has an input 32 with an associated jack formed on the periphery of the housing. The jack of the input is connected to a conventional telephone line. The telephone interface module further has an output 34 with an associated jack formed on the periphery the housing. The jack of the output is coupled to an interfacing jack of a corresponding conventional telephone. The telephone interface module also has an internal interface 36 for reasons that will become apparent later. In operation, the telephone interface module has a first mode of operation upon the lack of receipt of an initiation signal for allowing communication only between the input and the output. As such, normal operation of the conventional telephone is afforded. For allowing communication only between the input and the internal interface, the telephone interface module further has a second mode of operation upon the receipt of the initialization signal.

Still yet another component of the facsimile password unit is an initialization key 38 situated on the front face of the housing. The initialization key is electrically connected to the telephone interface. The initialization key is adapted for deploying an initialization signal to the conventional telephone line upon the use of the phone to connect via the telephone line to a second phone and further the depression thereof.

Finally, for governing the operation of the present invention, the facsimile password unit includes control circuitry 40 situated within the interior space of the housing. The control circuitry is electrically connected to the display, the keypad, the light emitting diode, the initialization key, the speaker, and the internal interface of telephone interface. In use, the control circuitry has a receipt mode to accommodate the situation wherein the facsimile password unit is utilized by a receiver of a fax. In such mode, when the telephone interface is transferred to the second mode thereof by the receipt of an initialization signal, the control circuitry is adapted to transmit to the light emitting diode the indicator light signal and further transmit to the speaker the alarm indicator signal. After such, the control circuitry is further adapted to effect the transmission of an initialization signal and subsequently allow numeric signals to be transmitted to the conventional telephone line upon the depression of corresponding numeric keys on the keypad. Ideally, the control circuitry ceases the transmission of the alarm indicator signal upon the depression of the first one of the numeric key. To accommodate the situation wherein the facsimile password unit is utilized by a sender of a fax, the control circuitry has a sender mode. In the sender mode, the control circuitry is further adapted to allow the transmission of numeric signals to the display upon the receipt of an initialization signal and subsequent receipt of the numeric signals. It should be noted that the receipt of the numeric signals is what prompts the control circuitry to transfer to the sender mode thereof to preclude the speaker and light emitting diode from actuating.

The method associated with the present invention is afforded by first providing the foregoing components. Prior to sending a fax, a sending user may call a receiver of a fax via one of the conventional phones. Either just prior to or after calling the receiver of the fax, the initialization key of the facsimile password unit of the sending user is depressed. As such, the telephone interface module of the receiving user is placed in the second mode such that the control circuitry may be utilized in the receipt mode thereof. Accordingly, the receiving user is alerted via the light emitting diode and the speaker. Next, the receiving user may depress numeric keys of the facsimile password unit thereof which are representative of a personal identification number. It should be noted that upon the depression of the first numeric key, the speaker no longer sounds. The numeric signals are in turn transmitted to the facsimile password unit of the sending user along with an initialization signal which allows the control circuitry of the sending user to be utilized in the sender mode thereof. As such, the numbers depicted on the display of the facsimile password unit of a sending user may be verified prior to sending a facsimile.

Figure 4:
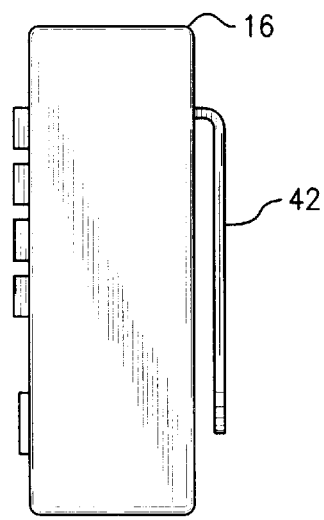
FIG. 4 is a side elevational view of an alternate embodiment of the present invention.
Figure 5:
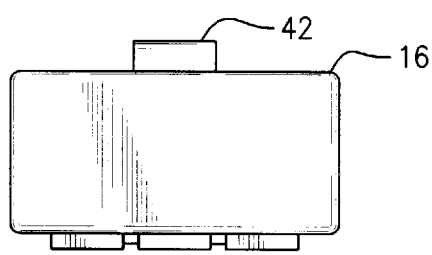
FIG. 5 is a top plan view of the alternate embodiment of the present invention
Figure 6:
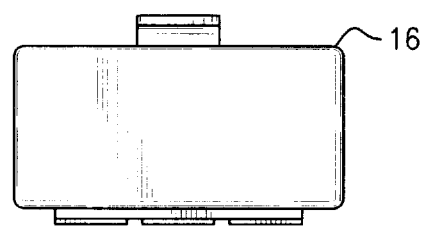
FIG. 6 is a bottom view of the alternate embodiment of the present invention
Figure 7:
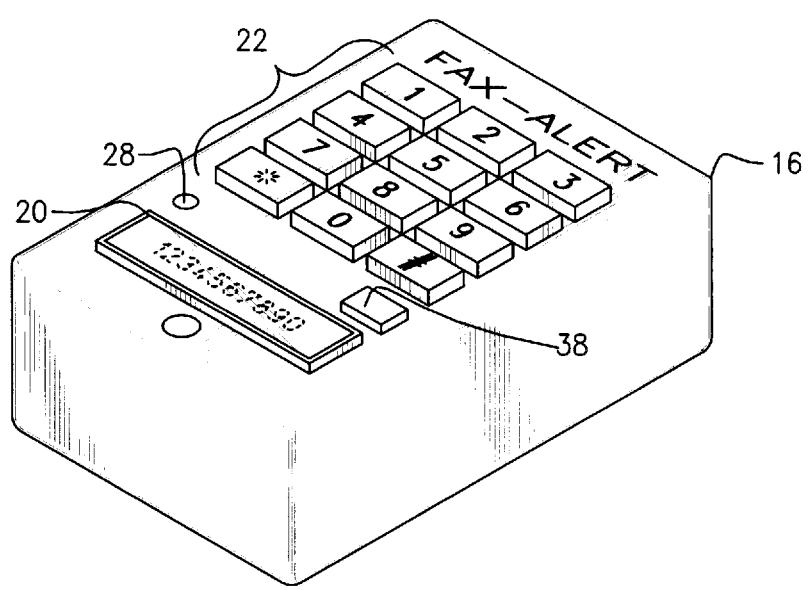
FIG. 7 is a perspective view of the present invention.
Figure 8:
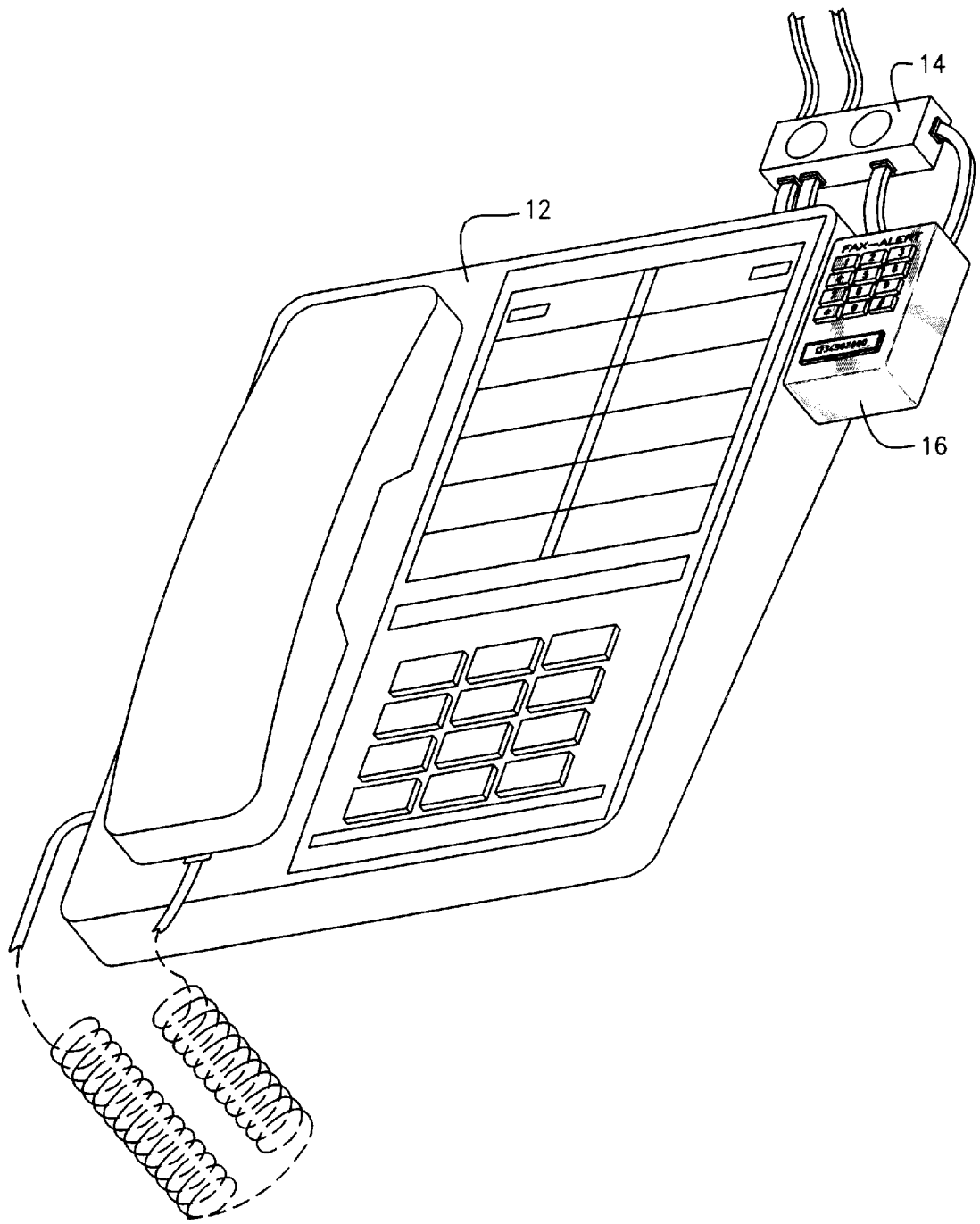
FIG. 8 is a perspective view of the present invention in use.
Figure 9:
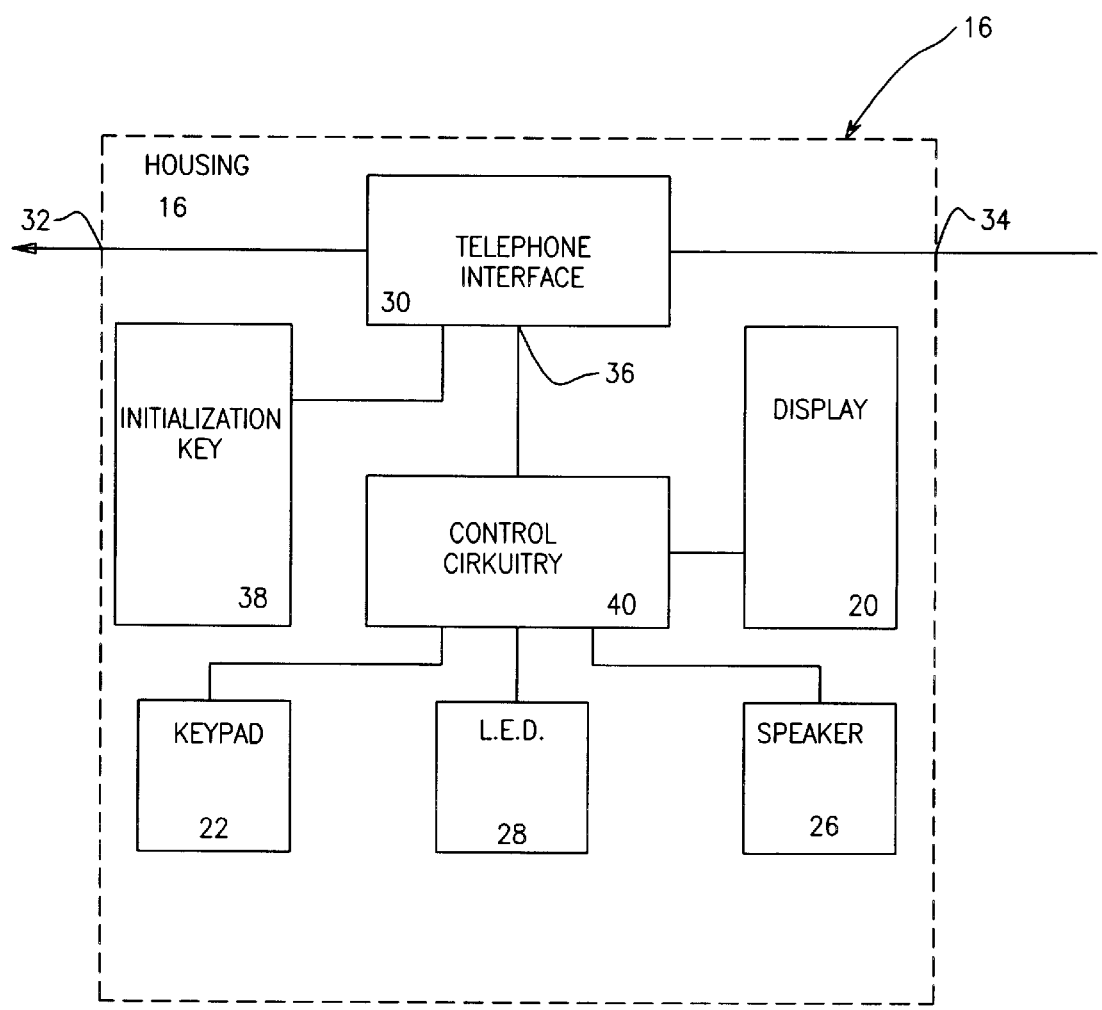
FIG. 9 is a schematic diagram depicting the interconnection of components of the present invention.

In an alternate embodiment, the telephone interface module is replaced with cellular telephone circuitry. By this structure, the initialization signal and numeric signals are transmitted via free space with conventional cellular signals. Since the facsimile module is afforded mobility by this design choice, the use may wear the module and be available to receive a fax at any time. As shown in FIGS. 4–6, a clip 42 may be utilized for allowing a user to wear the facsimile password unit.

The present invention is a device for allowing a sending user with a facsimile password unit to send a facsimile to a receiving user who also has a facsimile password unit such that the sending user may first transmit an initialization signal to the facsimile password unit of the receiving user. Such initialization signal prompts the receiving user to depress numeric keys of the facsimile password unit thereof representative of a personal identification. The present invention allows the sending user to ascertain the identity of the receiving user prior to sending the facsimile and further alerts the receiving user to reside by a facsimile machine to appropriately receiver the fax.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An apparatus for verifying the identity of a receiver of a facsimile comprising, in combination:

a plurality of conventional phones each with an interfacing jack; and a facsimile password unit attached to each conventional phone, each facsimile password unit including:

a housing with a top face, a bottom face, and a periphery integrally coupled therebetween thereby defining an interior space, the periphery of the housing coupled to an associated phone, a digital liquid crystal display situated on the front face of the housing, the liquid crystal display adapted to depict numbers thereon representative of a numeric signal upon the receipt thereof, a numeric keypad with a plurality of number keys positioned on the front face of the housing for transmitting a numeric signal representative of a plurality of numbers upon the depression of corresponding number keys, a speaker situated on the front face of the housing, the speaker adapted to transmit a unique audible indicator alarm upon the receipt of an indicator alarm signal, a light emitting diode positioned on the front face of the housing for intermittently emitting an indicator light upon the receipt of an indicator light signal, a telephone interface module situated within the interior space of the housing, the telephone interface module having an input with an associated jack formed on the periphery of the housing, the jack of the input connected to a conventional telephone line, the telephone interface module further having an output with an associated jack formed on the periphery the housing, the jack of the output coupled to an interfacing jack of a corresponding conventional telephone, the telephone interface module further having an internal interface, the telephone interface module having a first mode of operation upon the lack of receipt of an initiation signal for allowing communication only between the input and the output thereby affording normal operation of the conventional telephone and a second mode of operation upon the receipt of the initialization signal adapted to allow communication only between the input and the internal interface, an initialization key situated on the front face of the housing and coupled to the telephone interface for deploying an initialization signal to the conventional telephone line upon the use of the phone to connect via the telephone line to a second phone, and control circuitry situated within the interior space of the housing and electrically connected to the display, the keypad, the light emitting diode, the initialization key, the speaker, and the internal interface of telephone interface, the control circuitry having a receipt mode wherein the control circuitry is adapted when the telephone interface is in the second mode thereof to transmit to the light emitting diode the indicator light signal and further transmit to the speaker the alarm indicator signal whereat the control circuitry is further adapted to allow the transmission of an initialization signal and subsequent numeric signals to the conventional telephone line upon the depression of corresponding numeric keys on the keypad, the control circuitry is further adapted in a sender mode to allow the transmission of numeric signals to the display upon the receipt of an initialization signal and subsequent receipt of the numeric signals;

whereby a sending user with a facsimile password unit sending a facsimile to a receiving user who also has a facsimile password unit may first transmit an initialization signal to the facsimile password unit of the receiving user whereat the receiving user may depress numeric keys of the facsimile password unit thereof representative of a personal identification such that the sending user may verify such personal identification number prior to sending the facsimile.

2. An apparatus for verifying the identity of a receiver of a facsimile comprising:

a display adapted to depict numbers thereon representative of a numeric signal upon the receipt thereof;

a numeric keypad with a plurality of number keys for transmitting a numeric signal representative of a plurality of numbers upon the depression of corresponding number keys;

alarm indicator means adapted to alert a user upon the receipt of an alarm indicator signal;

control circuitry electrically connected to the display, the keypad, and the alarm indicator means, the control circuitry having a receipt mode wherein the control circuitry is adapted upon the receipt of an initialization signal to transmit to the alarm indicator means the alarm indicator signal whereat the control circuitry is further adapted to allow the transmission of numeric signals upon the depression of corresponding numeric keys on the keypad, the control circuitry is further adapted in a sender mode to allow the transmission of numeric signals to the display upon the receipt of numeric signals;

whereby a sending user with a facsimile password unit sending a facsimile to a receiving user with a facsimile password unit may first transmit an initialization signal to the facsimile password unit of the receiving user whereat the receiving user may depress numeric keys of the facsimile password unit thereof representative of a personal identification such that the sending user may verify such personal identification number prior to sending the facsimile.

3. An apparatus for verifying the identity of a receiver of a facsimile as set forth in claim 2 wherein the initialization signal and numeric signals are transmitted via free space with conventional cellular signals.

4. An apparatus for verifying the identity of a receiver of a facsimile as set forth in claim 2 and further comprising a plurality of conventional phones each with an interfacing jack wherein each telephone comprises a facsimile password unit, whereby the initialization signal is transmitted via the conventional telephones and further conventional telephone lines.

5. An apparatus for verifying the identity of a receiver of a facsimile as set forth in claim 2 wherein the alarm indicator means comprises a speaker situated on the front face of the housing, the speaker adapted to transmit a unique audible indicator alarm upon the receipt of an indicator alarm signal; and a light emitting diode positioned on the front face of the housing for intermittently emitting an indicator light upon the receipt of the alarm indicator signal.

6. A method of verifying the receiver of a facsimile comprising the steps of:

providing a plurality of conventional phones each with an interfacing jack;

providing a facsimile password unit attached to each conventional phone, each facsimile password unit including:

a housing with a top face, a bottom face, and a periphery integrally coupled therebetween thereby defining an interior space, the periphery of the housing coupled to an associated phone, a digital liquid crystal display situated on the front face of the housing, the liquid crystal display adapted to depict numbers thereon representative of a numeric signal upon the receipt thereof, a numeric keypad with a plurality of number keys positioned on the front face of the housing for transmitting a numeric signal representative of a plurality of numbers upon the depression of corresponding number keys, a speaker situated on the front face of the housing, the speaker adapted to transmit a unique audible indicator alarm upon the receipt of an indicator alarm signal, a light emitting diode positioned on the front face of the housing for intermittently emitting an indicator light upon the receipt of an indicator light signal, a telephone interface module situated within the interior space of the housing, the telephone interface module having an input with an associated jack formed on the periphery of the housing, the jack of the input connected to a conventional telephone line, the telephone interface module further having an output with an associated jack formed on the periphery the housing, the jack of the output coupled to an interfacing jack of a corresponding conventional telephone, the telephone interface module further having an internal interface, the telephone interface module having a first mode of operation upon the lack of receipt of an initiation signal for allowing communication only between the input and the output thereby affording normal operation of the conventional telephone and a second mode of operation upon the receipt of the initialization signal adapted to allow communication only between the input and the internal interface, an initialization key situated on the front face of the housing and coupled to the telephone interface for deploying an initialization signal to the conventional telephone line upon the use of the phone to connect via the telephone line to a second phone, and control circuitry situated within the interior space of the housing and electrically connected to the display, the keypad, the light emitting diode, the initialization key, the speaker, and the internal interface of telephone interface, the control circuitry having a receipt mode wherein the control circuitry is adapted when the telephone interface is in the second mode thereof to transmit to the light emitting diode the indicator light signal and further transmit to the speaker the alarm indicator signal whereat the control circuitry is further adapted to allow the transmission of an initialization signal and subsequent numeric signals to the conventional telephone line upon the depression of corresponding numeric keys on the keypad, the control circuitry is further adapted in a sender mode to allow the transmission of numeric signals to the display upon the receipt of an initialization signal and subsequent receipt of the numeric signals;

calling a receiving user via one of the conventional phones;

depressing the initialization key of the facsimile password unit of a sending user;

depressing numeric keys of the facsimile password unit of the receiving user representative of a personal identification number thereof;

verifying the numbers depicted on the display of the facsimile password unit of a sending user; and sending a facsimile if the numbers depicted on the display of the facsimile password unit of the sending user are verified.

* * * * *